United States Patent [19]

Wadell

[11] Patent Number: 4,808,424
[45] Date of Patent: Feb. 28, 1989

[54] PROCESS FOR COATING FOODSTUFFS WITH PARTICULATE MATERIAL

[75] Inventor: Lars G. A. Wadell, Aastorp, Sweden

[73] Assignee: Nestec S.A., Vevey, Switzerland

[21] Appl. No.: 216,780

[22] Filed: Jul. 8, 1988

Related U.S. Application Data

[62] Division of Ser. No. 937,236, Dec. 3, 1986, Pat. No. 4,762,083.

[30] Foreign Application Priority Data

Jan. 23, 1986 [EP] European Pat. Off. ........ 86100864.7

[51] Int. Cl.$^4$ ............................................... A23B 4/10
[52] U.S. Cl. .................................... 426/289; 426/292; 426/295
[58] Field of Search ............... 426/289, 292, 295, 643; 118/16, 18, 24, 312

[56] References Cited

U.S. PATENT DOCUMENTS

| | | | |
|---|---|---|---|
| 2,865,766 | 12/1958 | Christianson et al. | 426/289 |
| 3,036,533 | 5/1962 | Burt et al. | 426/295 |
| 3,404,659 | 10/1968 | Croston | 118/24 |
| 3,547,075 | 12/1970 | Johnson | 118/16 |
| 3,870,013 | 3/1975 | Wagner | 118/24 |
| 3,885,519 | 5/1975 | Orlowski | 118/16 |

Primary Examiner—George Yeung
Attorney, Agent, or Firm—Vogt & O'Donnell

[57] ABSTRACT

A foodstuff is coated with particulate material by transferring the particulate material from a first conveyor travelling in one direction onto the foodstuff being transported on a first belt of a second conveyor located below the first conveyor which travels in the direction opposite to the first conveyor. While the coated foodstuff is transferred to a second belt of the second conveyor, particulate material falls off the first belt through a gap between the first belt and the second belt onto an inclined portion of the second belt. The particulate material is conveyed to the horizontal upper run of the second belt which forms a layer on which the coated foodstuff lies for being coated on a bottom side after being transported to the second belt. The coated foodstuff is then transferred from the second belt to the third belt of the second conveyor, with further particulate material falling through the gap between the second and third belts onto the inside wall of a drum. The drum is rotated for transporting the further material to a position above the first conveyor upon which the material falls by gravity.

9 Claims, 2 Drawing Sheets

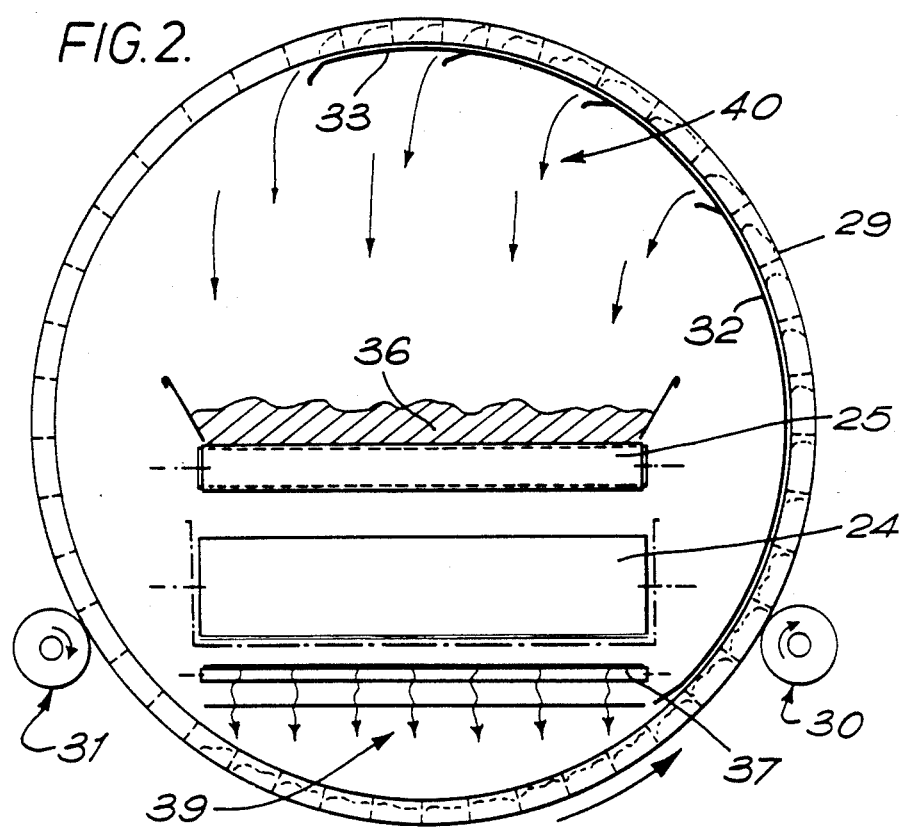
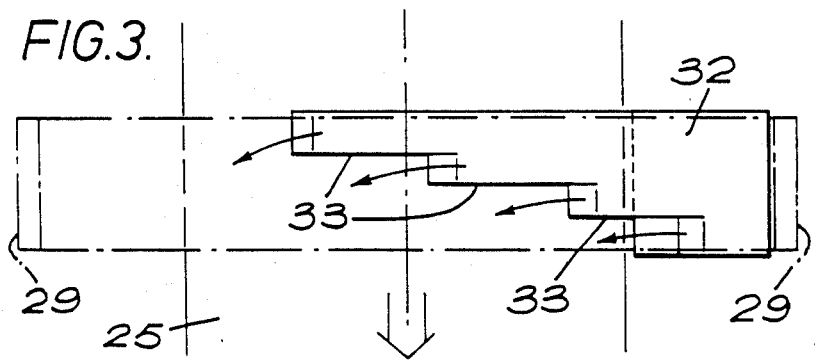

PROCESS FOR COATING FOODSTUFFS WITH PARTICULATE MATERIAL

CROSS REFERENCE TO RELATED APPLICATIONS

This is a divisional application of application Ser. No. 06/937,236, filed Dec. 3, 1986, now U.S. Pat. No. 4,762,083.

BACKGROUND OF THE INVENTION

The present invention relates to an apparatus and method of coating a foodstuff with a particulate material.

In the preparation of frozen coated food products such as fish, mesh or vegetables suitable for oven-cooking, the foodstuff is usually coated with batter, breaded, prefried, deep-frozen and then packaged. The breading material is normally a particulate material such as bread crumbs or shredded cheese, or it may be a particulate material derived from dehydrated potato, for example, potato flakes, potato powder or potato granules. The average size of the particles is generally from 0.1 to 2.0 mm diameter and the maximum volume of a particle is not usually more than about 10 cubic millimetres. The amount of breading material used in conventional procedures is normally not more than 20% by weight based on the total weight of the product.

Normally, large amounts of coating material fall off the foodstuff during the coating process and it is important that this excess coating material is reused. In conventional equipment this is normally done by elevator screws which transport the excess coating material upwards for reuse. This means that large amounts of coating material are always in circulation and exposed to the warm air of the environment which is not desirable since it is important that the coating material should be maintained at as low a temperature as possible.

From an organoleptic point of view it would be very desirable to use fresh potato particles as the coating material but up to the present time this has not been done successfully on a commercial scale. Owing to the higher water content of fresh potato when compared with dehydrated potato, the particle size has to be larger and it is not possible to obtain a satisfactory, even distribution of the particulate fresh potato material using conventional methods because in conventional equipment, the elevator screws cannot recirculate the excess particles of larger size evenly or without damaging them.

SUMMARY OF THE INVENTION

We have now developed a completely new principle for coating a foodstuff with a particulate material using an apparatus which is not only very much simpler but also enables very much smaller amounts of coating material to be in circulation at any period in time when compared with conventional apparatus. In addition, the apparatus of our invention can handle particles having a larger size than particles of the usual coating materials so that they are distributed evenly on the food product without damage.

According to the present invention there is provided an apparatus for coating a foodstuff with a particulate material characterised in that it comprises a horizontal drum capable of rotating on its longitudinal axis, two horizontal conveyors one positioned above the other adapted to travel longitudinally in opposite directions through the horizontal drum, the lower horizontal conveyor comprising three endless conveyor belts having horizontal upper runs arranged successively whereby the upper run of the second belt has an inclined portion positioned below the first belt and which travels upwards to form a horizontal portion and the gap between the second belt and the third belt is situated within the horizontal drum, means for feeding particulate material onto the upper horizontal conveyor and means for feeding the foodstuff onto the first belt of the lower horizontal conveyor so that particulate material is transferred from the upper conveyor onto the foodstuff on the first belt, excess particulate material falls off the forward end of the first belt onto the inclined portion of the second belt and is conveyed to the horizontal portion to form a layer on which the foodstuff lies after being transported from the first belt to the horizontal portion of the upper run of the second belt, and further excess particulate material falls through the gap between the second and third conveyor belts onto the lower part of the inside wall of the horizontal drum from where it travels upwards on the inside wall until it reaches a position above the upper conveyor on to which the particulate material falls by gravity.

It can be seen that, by means of the apparatus of this invention, the foodstuff may be completely coated on both sides.

The foodstuff may be any foodstuff which may be coated with particulate material, for example, vegetables, meat or fish. Before being coated the foodstuff is conveniently battererd to enable the particulate material to adhere to the foodstuff. The batter may be, for instance, Tempura batter.

The particulate material may be any kind of crumb, such as bread crumbs, shredded cheese, or particulate material from dehydrated potato, for example, potato flakes, potato powder or potato granules. However, this invention is especially suitable when the particulate material is derived from fresh potato, where the individual particles have a volume from 20 to 250, preferably from 30 to 200 and especially from 40 to 150 cubic millimetres, for example, potato cubes or potato strips.

The upper horizontal conveyor is preferably a solid endless belt substantially without perforations. The fresh particulate material, together with that which has fallen by gravity from the upper inside surface of the drum is transported to the extremity of the upper horizontal conveyor where it falls off onto the foodstuff travelling on the first belt of the conveyor below. Conveniently, the upper horizontal conveyor is adapted to vibrate. When the upper horizontal conveyor is an endless belt, the vibration may conveniently be achieved by means of a triangular roller situated beneath and in contact with the upper run between the two end rollers. This enables a more even distribution of the particulate material.

Preferably, a vibrator is positioned between the upper and lower horizontal conveyors to receive the particulate material which falls off the extremity of the upper conveyor to distribute it onto the foodstuff travelling on the lower conveyor.

The first belt of the lower horizontal conveyor is advantageously perforated to enable excess batter to fall through and be collected for recirculation. If desired, additional belts may be provided which precede the first belt and these are also advantageously perforated.

Any belt containing gaps or apertures is suitable but a wire mesh belt is especially preferred. The perforations should be of such a size not to allow the particulate material to pass through. The second and third belts of the lower horizontal conveyor are preferably solid belts substantially without perforations. If desired, one or more belts may be provided which succeed the third belt to carry the coated food product away.

The present invention also provides a method for coating a foodstuff with a particulate material characterised in that an upper and a lower horizontal conveyor travel longitudinally in opposite directions through a horizontal rotating drum, particulate material is fed onto an upper horizontal conveyor, foodstuff is fed onto the first belt of a lower horizontal conveyor comprising three endless conveyor belts having horizontal upper runs arranged successively whereby the upper run of the second belt has an inclined portion positioned below the first belt and which travels upwards to form a horizontal portion and the gap between the second belt and the third belt is situated within the horizontal drum, particulate material is transferred from the upper conveyor onto the foodstuff on the first belt, excess particulate material falls of the forward end of the first belt onto the inclined portion of the second belt and is conveyed to the horizontal portion to form a layer on which the foodstuff lies after being transported from the first belt to the horizontal portion of the upper run of the second belt and further excess particulate material falls through the gap between the second and third belts onto the lower part of the inside wall of the horizontal drum which rotates longitudinally carrying the particulate material upwards on the inside wall until it reaches a position above the upper conveyor on to which the particulate material falls by gravity.

The foodstuffs coated by the apparatus and method of the present invention may afterwards be prefried before being deep-frozen. They may be prepared for consumption simply by heating in an oven. The apparatus and method is especially suitable for coating a foodstuff, especially battered fresh or frozen raw fish material with dehydrated potato cubes or strips whereby the foodstuff is coated with between 10 and 70%, preferably from 15 to 50% and especially from 20 to 40% by weight of particulate material based on the total weight of the food product.

The present invention will now be further illustrated by way of example with reference to the following drawings.

BRIEF DESCRIPTION OF THE DRAWINGS FIG. 1 is a sectional side view of the apparatus and FIG. 2 is a transverse section through the drum along the line A—A in FIG. 1, and FIG. 3 is a top plan view of the upper end of a stationary plate positioned adjacent the inside wall of the drum.

DESCRIPTION OF THE PREFERRED EMBODIMENTS

Figure 1:
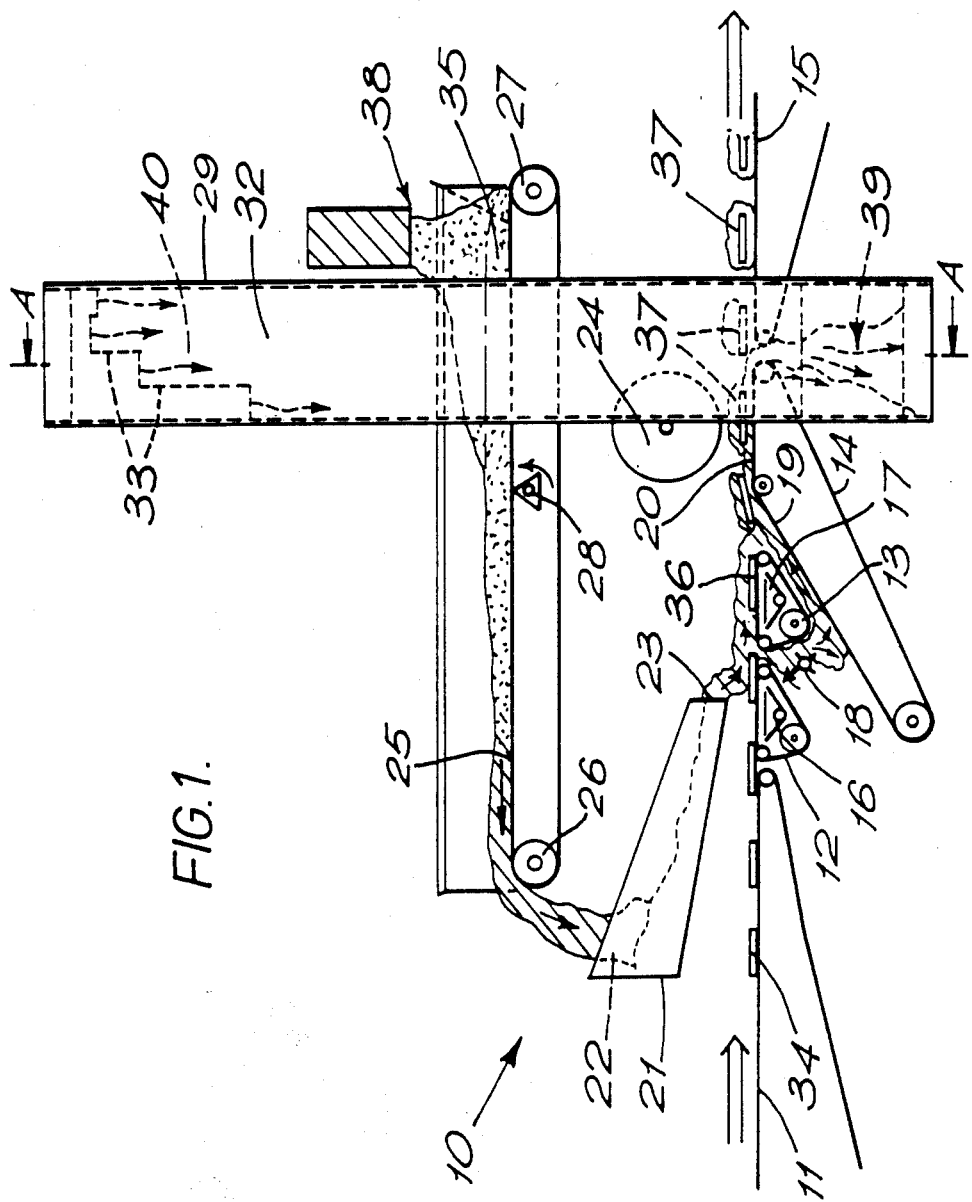

Referring to the drawings, the apparatus generally designated 10 comprises a horizontal conveyor for transporting a foodstuff, consisting of a solid belt 11, wire mesh belts 12 and 13 are solid belt 14 and 15. Beneath the upper runs of wire belts 12 and 13 are batter collectors 16 and 17 respectively. In between wire belts 12 and 13 is a spreading roller 18. The upper run of solid belt 14 has an inclined portion 19 and a horizontal portion 20. Positioned above the horizontal conveyor is a vibrator 21 having an entry opening 22 and an exit opening 23 above wire belt 12, and a pressure roller 24 positioned above the horizontal portion 20 of the upper run of solid belt 14.

Situated above the vibrator and pressure roller is a second horizontal solid endless conveyor belt 25 trained around rollers 26 and 27 and having a triangular roller 28 underneath the upper run positioned so that the angles contact the upper run as it rotates. The roller 26 is positioned directly over the entry opening 22 of the vibrator 21.

A rotating drum 29 driven by drive rollers 30, 31 is positioned so that the horizontal portion 20 of the upper run of belt 14 as well as part of belts 15 and 25 travel through it. Positioned adjacent the inside wall of the drum 29 is a stationary plate 32, the upper end of which 33 is designed to allow particulate material to be discharged evenly over the width of the belt 25. Other suitable designs of the upper end of the stationary plate will be readily apparent to a person skilled in the art.

Also illustrated in the drawings are battered frozen fish portions 34, potato cubes 35, battered frozen fish portions coated on top with potato cubes 36, battered frozen fish portions coated completely with potato cubes 37, means 38 whereby to the upper run of the belt 25 potato cubes are continuously added, and arrows 39 and 40 indicating the fall of potato cubes inside the drum.

In operation, the upper runs of wire mesh belts 11, 12 and 13, solid belts 14 and 15, the belt 25, the spreading roller 18 and the rotating drum 29 travel in the direction indicated by the arrows.

Battered frozen fish portions 34, each weighing 50 g are fed from a battering machine (not shown) on belt 11. Fresh potato cubes 35 having dimensions of 3 mm×3 mm×7 mm are fed continuously from a means 38 on to the conveyor belt 25 which vibrates by means of the rotation of the triangular roller 28. The potato cubes are transported to the end of the belt which is trained around roller 26 where they fall off and enter the vibrator 21 at the opening 22. The potato cubes leave the vibrator at the exit opening 23 and fall onto the fish portions which are lying on belt 12, to give frozen fish portions coated on top 36. Excess batter falls into the batter collectors 16 and 17 and excess potato cubes fall between belts 12 and 13 onto the inclined portion 19 of the upper run of belt 14 via the spreading roller 18. The excess potato cubes are transported on the inclined portion 19 of the upper run of solid belt 14 in the direction of the arrow to the horizontal portion 20 where the frozen fish portions coated on top travel from belt 13 to lie on the excess potato cubes so that they become completely coated fish portions 37, and pass under the pressure roller 24.

The completely coated fish portions 37 then pass through the rotating drum 29. Inside the drum excess potato cubes 35 fall between belts 14 and 15 indicated by the arrows 39 onto the lower part of the inside wall of the drum and travel upwards on the inside wall supported by the stationary plate 32, until they reach a position above the belt 25 where, indicated by the arrows 40, they fall onto the belt 25 and spread in an even manner owing to the design of the upper end 33 of the plate 32. There, they are transported, along with potato cubes fed by means 38, to be recirculated by falling off the end of the belt trained around roller 26 into the vibrator 21 and onto the battered fish portions 34.

After emerging from the inside of the rotating drum 29 on the wire belt 15, the completely coated fish portions are transported to a fryer (not shown) and then deep-frozen.

I claim:

1. A process for coating a foodstuff with particulate material comprising:

transporting particulate material on a first horizontal conveyor;

transporting a foodstuff on a second horizontal conveyor positioned below the first conveyor in a direction opposite that of the first conveyor, the second conveyor comprising at least first, second and third successive endless belts each having a horizontal upper run and a gap between each successive pair of belts, the second belt having an inclined portion extending to a position below the first belt;

feeding the particulate material from the first conveyor onto the foodstuff on the first belt for coating the foodstuff on an upper side;

transporting the coated foodstuff to the upper run of the second belt while excess particulate material falls off the first belt through the gap between the first and second belts onto the inclined portion of the second belt for being conveyed to the upper run of the second belt for forming a layer onto which the coated foodstuff is transported for being coated on a bottom side after being transported from the first belt to the upper run of the second belt;

transporting the coated foodstuff to the third belt with further excess particulate material falling through the gap between the second and third belts onto an inside wall of a drum through which the first and second conveyors travel; and rotating the drum for transporting the further excess particulate material to a position above the first conveyor upon which the further excess particulate material falls by gravity.

2. A process according to claim 1 further comprising transporting the coated foodstuff from the first belt to an additional belt preceding the second belt then to the second belt with particulate material falling through a gap between the first and additional belts onto the inclined portion of the second belt.

3. A process according to claim 1 further comprising removing the coated foodstuff from the third belt onto a belt downstream from the third belt.

4. A process according to claim 1 further comprising vibrating the first conveyor.

5. A process according to claim 4 wherein the first conveyor is vibrated by means of a triangular roller situated beneath and in contact with an upper run of the first conveyor.

6. A process according to claim 1 further comprising feeding the particulate material from the first conveyor to a vibrator and then to be first belt.

7. A process according to claim 1 wherein the foodstuff is battered fish.

8. A process according to claim 1 wherein the particulate material is derived from fresh potato and has an individual particle volume of from 20 to 250 cubic millimeters.

9. A process according to claim 1 wherein the foodstuff is coated with from 20% to 50% by weight of particulate material based on the weight of the coated foodstuff.

* * * * *

UNITED STATES PATENT AND TRADEMARK OFFICE
CERTIFICATE OF CORRECTION

PATENT NO. : 4,808,424

DATED : February 28, 1989

INVENTOR(S) : Lars G.A. WADELL

It is certified that error appears in the above-identified patent and that said Letters Patent is hereby corrected as shown below:

Column 1, line 16, "mesh" should be --meat--.

Column 3, line 50, "BRIEF DESCRIPTION OF THE DRAWINGS" should be in its own separate heading and "Fig." should begin a new line.

Column 3, line 62, "are" should be --and--.

Signed and Sealed this

Twenty-second Day of August, 1989

Attest:

DONALD J. QUIGG

Attesting Officer

Commissioner of Patents and Trademarks